(12) United States Patent
Vasilyuk et al.

(10) Patent No.: US 10,788,586 B2
(45) Date of Patent: Sep. 29, 2020

(54) MULTICHANNEL INERTIAL MEASUREMENT UNIT AND INTEGRATED NAVIGATION SYSTEMS ON ITS BASIS

(71) Applicant: Topcon Positioning Systems, Inc., Livermore, CA (US)

(72) Inventors: Nikolay Nikolaevich Vasilyuk, Moscow (RU); Sergey Ivanovich Tychinskiy, Moscow (RU); Alexandr Vladimirovich Doronin, Moscow (RU); Dmitry Konstantinovich Tokarev, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 323 days.

(21) Appl. No.: 15/759,946

(22) PCT Filed: Dec. 7, 2017

(86) PCT No.: PCT/RU2017/000913
§ 371 (c)(1),
(2) Date: Mar. 14, 2018

(87) PCT Pub. No.: WO2019/112461
PCT Pub. Date: Jun. 13, 2019

(65) Prior Publication Data
US 2019/0179030 A1   Jun. 13, 2019

(51) Int. Cl.
*G01S 19/10* (2010.01)
*G01C 21/16* (2006.01)
(Continued)

(52) U.S. Cl.
CPC .......... *G01S 19/10* (2013.01); *G01C 21/165* (2013.01); *G01S 19/47* (2013.01); *B64C 2201/141* (2013.01); *G01S 19/49* (2013.01)

(58) Field of Classification Search
CPC .......... G01S 19/10; G01S 19/47; G01S 19/49; G01C 21/165; B64C 2201/141
(Continued)

(56) References Cited

U.S. PATENT DOCUMENTS

| 4,303,978 A | 12/1981 | Shaw et al. |
| 6,127,970 A * | 10/2000 | Lin .......................... G01S 19/23 342/357.31 |

(Continued)

FOREIGN PATENT DOCUMENTS

RU   2539131 C1   1/2015

OTHER PUBLICATIONS

Search Report in PCT/RU2017/000913, dated Aug. 9, 2018.

*Primary Examiner* — Chuong P Nguyen
(74) *Attorney, Agent, or Firm* — Bardmesser Law Group

(57) ABSTRACT

Multichannel inertial measuring unit (MIMU) contains sensors for measurements of vector and scalar parameters of motion (angular speed, specific acceleration, magnetic field, etc.), and independent hardware interfaces to transmit measured data. Measured information is read out from MIMU via each hardware interface irrespective of other hardware interfaces. The format of data presentation for each hardware interface is randomly selected from a predefined list. Measurements from MIMU are generated by a set of sensors within a common timescale. The timescale for synchronization of sensor measurements can be both generated within MIMU by a stable clock generator and transmitted to MIMU from outside, including from one of users of measured data. MIMU also can generate synchronization signals to transmit its timescale to external users. The MIMU allows building navigation systems when the same inertial measurements are used within independent computation modules implementing different algorithms of integrating these measurements
(Continued)

Figure 1:
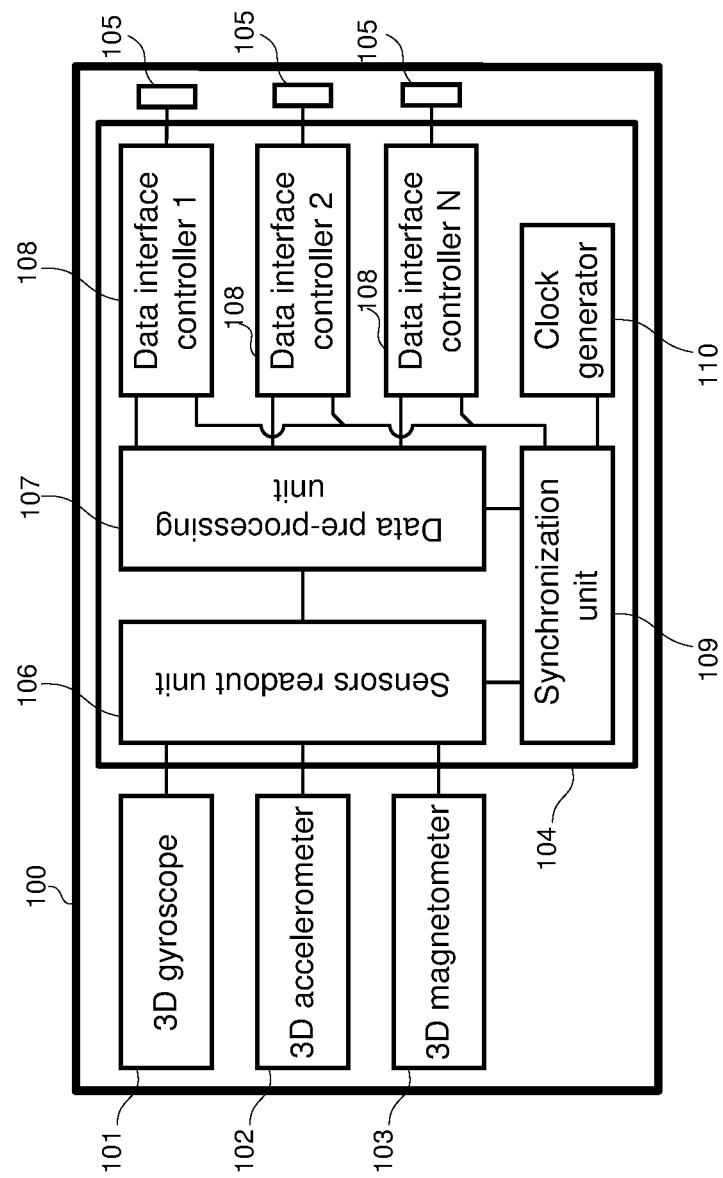

with navigation data from satellite measurements, measurements of odometer, altimeter, etc.

18 Claims, 4 Drawing Sheets

(51) Int. Cl.
  *G01S 19/47* (2010.01)
  *G01S 19/49* (2010.01)
(58) Field of Classification Search
  USPC .............. 342/357.47, 357.3, 357.32; 73/1.75, 73/1.77; 701/500
  See application file for complete search history.

(56) References Cited

U.S. PATENT DOCUMENTS

| | | | |
|---|---|---|---|
| 6,205,400 B1 * | 3/2001 | Lin | G01C 21/165 342/357.31 |
| 6,298,318 B1 * | 10/2001 | Lin | G01C 21/16 434/2 |
| 6,317,688 B1 | 11/2001 | Bruckner et al. | |
| 6,735,523 B1 * | 5/2004 | Lin | G01S 19/23 342/357.31 |
| 6,879,875 B1 | 4/2005 | Hu et al. | |
| 7,136,751 B2 * | 11/2006 | Pinto | G01C 21/165 701/470 |
| 7,171,303 B1 * | 1/2007 | Nordmark | G01C 21/165 701/472 |
| 7,248,964 B2 * | 7/2007 | Bye | G01C 21/165 342/357.31 |
| 7,739,045 B2 * | 6/2010 | Thompson, Jr. | G01C 21/16 701/510 |
| 9,052,202 B2 * | 6/2015 | Riley | G01C 21/165 |
| 9,714,841 B2 * | 7/2017 | Toda | G01S 19/23 |
| 10,670,734 B2 * | 6/2020 | Glocker | G01S 19/44 |
| 2020/0025942 A1 * | 1/2020 | Kassas | G01S 19/47 |

* cited by examiner

MULTICHANNEL INERTIAL MEASUREMENT UNIT AND INTEGRATED NAVIGATION SYSTEMS ON ITS BASIS

BACKGROUND OF THE INVENTION

Field of the Invention

The present invention relates to designing strapdown inertial measurement units and integrated navigation systems that are coupled to inertial measurements and navigation measurements of various physical nature.

Background of the Related Art

In a typical integrated navigation system, outputting navigation solutions as a result of coupling inertial measurements with navigation data of different physical nature (GNSS-measurements, measurements of odometers, altimeters, etc.), all sources of navigation information are connected to common computation unit via corresponding hardware interfaces like COM-port, RS232 interface, RS485/RS422 interface, CAN interface, MIL1553B interface, etc. The strapdown inertial measurement unit (IMU) in such a system has, as a rule, a single information and control hardware interface (RS232/484/422/CAN/MIL1553B, etc.) which is fully used for data exchange with single computation unit. The IMU generates inertial data with the aid of set of inertial sensors. This sensor set, as a rule, includes accelerometers with mutually perpendicular measurement axes and gyros with mutually perpendicular measurement axes.

For correct interpretation of measurements received from multiple sensors, the moment of time (called "epoch") when each sensor's measurement was received must be known. Also, the time interval between two consecutive measurements from the same sensor must be known. To define these two parameters, an appropriate timescale must be introduced. the timescale is defined by the selection of some periodical synchronization signal and by selection of a time unit as a relation between a duration of this time unit and period of synchronization signal. The timescale can be generated by any device that can produce a periodic sync signal All sensors are sampled using a common time scale, which may be generated by external computational unit or by IMU itself. In both cases, the IMU hardware interface also contains hardware synchronization line to transfer the time scale from source to destination (i.e., from a computation unit to IMU in one case and from IMU to the computation unit in another case).

If the IMU with a single hardware interface is used inside a navigation system that contains several separate computational or data processing modules the problem of hardware connection of one IMU with multiple computational modules arises. This problem has two well-known solutions. The first solution is to use additional hardware interface multiplexer/demultiplexer or switching device. One port of this device is connected to the IMU hardware interface. All other ports of this device are connected to appropriate hardware interfaces of separate computational units intended for IMU connection. This connection approach may be used for any type of hardware interfaces. Another approach to connect single IMU to multiple computation units is to organize some system bus. IMU and all computation modules (which require IMU data) are connected to common bus where IMU sends data through the bus and modules receive data from the bus. Only a limited number of widely used hardware interfaces support the bus connection. For example, the CAN and MIL1553B interfaces support common bus connections, but RS232 interface not support common bus connections. In the discussion below, only the first type of connection (without a common bus) is considered.

The first type of connection between IMU and computational modules requires the IMU and computational modules to operate synchronously, using a common time scale. In addition, it requires identical hardware interface settings (IMU data rate, data frame structure, etc.) for all modules connected to IMU. If computational modules are not specially designed for a particular navigation system, but are designed by different independent manufacturers, or purchased on a secondary market, it is often impossible to satisfy these two requirements. Trying to connect different computational modules with different time scales and hardware interface settings to a common IMU requires additional external matching devices (one external matching device per each computational module). These matching devices have two main purposes—to re-sample IMU data from an IMU timescale to a timescale of appropriate computational unit, and to rearrange resampled IMU data to new data frames matched with interface settings of an appropriate computational unit.

To build an integrated navigation system with a several independent computation modules whose algorithms use inertial measurements, it is reasonable to use an IMU with several independently-operating hardware interfaces (like COM port, RS232 interface, RS485/RS422 interface, CAN interface, etc.) for IMU data exchange. The IMU of this type with several independently-operating interfaces will be further referred to as a "multichannel IMU", or MIMU. A MIMU is connected to each computation module via a separate hardware interface, which is adjusted in accordance with data communications protocol appropriate for this computation module. From the computation module's point of view, this connection looks like a dedicated point-to-point connection between an ordinary IMU and this module. The computation module can apply all required interface settings (time scale, sampling rate, data rate, data frame format, etc.) to the dedicated MIMU interface irrespective of connection status of other MIMU interfaces and computational modules The measurements are generated in MIMU by single set of sensors in the time scale which can be generated both inside MIMU and outside MIMU (by external clock source). If external modules generate their own synchronization signals for transferring their timescales to the MIMU, the MIMU resamples the measured data according these sync signals. This feature allows all separated computational modules to operate asynchronously, with their own timescales and to receive IMU data with dedicated synchronization. The MIMU can also generate synchronization signals to transmit its own time scale (within which its measurements have been done) for synchronization of external modules.

The use of a MIMU within the integrated navigation system can be considered as an exemplary embodiment of a system (for example) consisting of two units (separated logically and/or physically), requiring inertial measurements for their operation—a GNSS receiver and a navigation and control computation device. Software and firmware of each unit can be developed and manufactured independently of one another (even by different independent manufacturers). The MIMU is connected to each of these units via a separate hardware interface with individual settings.

Inertial measurements transmitted from the MIMU to the GNSS receiver through one of interfaces are coupled in the receiver with radio navigational measurements to improve the quality and availability of navigation solutions. Inertial measurements transmitted from the MIMU to the navigation and control computation device through another interface are used in algorithms of navigation and control of a moving vehicle on which the navigation and control system is installed (for example—for vehicle's yaw and roll stabilization algorithms) A GNSS receiver is connected to the same computation device as one of the navigation sensors.

Another exemplary embodiment of this invention includes various navigation devices (generally speaking, of different types), implementing algorithms of integrating inertial measurements with navigation data of different physical nature and combined in a single navigation and control system. According to this embodiment each device is connected to a separate MIMU interface and performs its coupling algorithm independently of other devices. The outputs of its operation are transmitted to a user for further processing and/or collecting the entire set of navigation parameters.

For example, a system of this kind may be assembled with separate roll stabilization computer, pitch stabilization computer, yaw stabilization computer, trajectory stabilization computer and logging device. All of these computing modules have to operate simultaneously, have to receive inertial data measured by a single IMU, but may operate using their own timescales and require their own IMU data reception rates. All these devices may be connected to separate MIMU interfaces and receive inertial data via dedicated point-to-point connections. Different versions of strapdown IMU and integrated navigation systems with such modules are known.

Reference [1] describes such an integrated navigation system consisting of two independent GNSS receivers and one IMU connected to a common processing module which further generates a navigation solution. The main drawback of this device is having only one interface of the IMU to connect to the data processing module.

Reference [2] describes a method of building a synchronization and reading unit to read out measurements from inertial sensors within IMU. The unit contains its own stable clock generator and input port to receive a synchronization signal with an external timescale. This version only has a single interface to transmit inertial measurements to the external user and lack of output synchronization signal to transmit the internal timescale to external users.

Reference [3] discloses an integrated navigation system with a couple of IMUs (both gimballed IMU and strapdown IMU), each of which is connected to some computation units. Each IMU in reference [3] has only one interface to exchange data, with one IMU being connected to several computation units (or several IMUs—to one computation unit) with the help of multiplexing/de-multiplexing circuits. Such a combination of some IMU and computation units into a common system is made to increase system redundancy, thereby enhancing its reliability and fault-tolerance.

Reference [4] discloses an integrated navigation system comprising some IMUs and some computation units. In reference [4] each IMU has only one interface, and combination of different IMUs, computation units and GNSS sensors is made based on a cascade connection. According to this connection, GNSS information and the information from one IMU is fed to the inputs of the first computation unit via different interfaces, some information from the output of the first computation unit and the second IMU is fed to the inputs of the second interfaces and so on.

Reference [5] describes an IMU with the configuration when there is no external synchronization signal. This device has only a data exchange interface.

Reference [6] discloses a method of designing IMU with reduced requirements to the output interface as raw data are stored and the stored information is further sent to the external sink according to its request. The information is outputted from IMU via the single interface which is the main difference from the proposed invention.

SUMMARY OF THE INVENTION

Accordingly, the present invention is related to a multi-channel strapdown inertial measurement unit that substantially obviates one or more of the disadvantages of the related art.

The present invention is directed to a multichannel strapdown inertial measurement unit comprising a typical set of sensors (3D-gyro, 3D-accelerator, 3D-magnetometer, etc.) and an internal computation unit for reading and preliminary processing of sensor information, as well as for generating output data flow. The computation unit of the MIMU includes two or more bidirectional data exchange interfaces. Each of these interfaces can transmit and receive data irrespective of the other interfaces, the format of data exchange being individually adjusted for each interface.

The MIMU computation unit is also responsible for generating a time scale according to which MIMU sensors are sampled and output data packets are generated. The MIMU time scale can be directly generated in a computation unit using an in-built stable clock generator, or can be set by external clock source. The MIMU can transmit its own time scale to its external users via data exchange interfaces.

To receive/transmit the timescale, in each MIMU interface there are input and output signals for receiving/transmitting clock signals, whose format is individually selected. If the timescale is received from an external clock source connected to the corresponding interface, the MIMU computation unit locks onto the input clock signal from this interface and synchronizes all internal measuring procedures and time diagrams in accordance with the received clock signal. Once a transition process of synchronization has been completed, all measurements and output data packets are generated according to the external timescale. Switching between different timescales transmitted to MIMU at the same time via MIMU interfaces is done in response to commands from external devices connected to these interfaces based on internal settings or based on MIMU external clock selection priority logic.

When the timescale is transmitted from the MIMU to external devices, all clock signals are generated from the single internal clock generator. The format of single clock signals which can be included into data exchange interface (frequency, duration, polarity of clock pulses etc.) is individually selected in settings of each interface.

An advantage of the proposed MIMU is availability of some independent exchange interfaces in the IMU, each of the interfaces is individually adjusted, interfaces can be connected to different computation units solving various navigation tasks, these interfaces not taking part in ensuring system redundancy.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 presents a general diagram of a multichannel inertial measurement unit.

Figure 2:
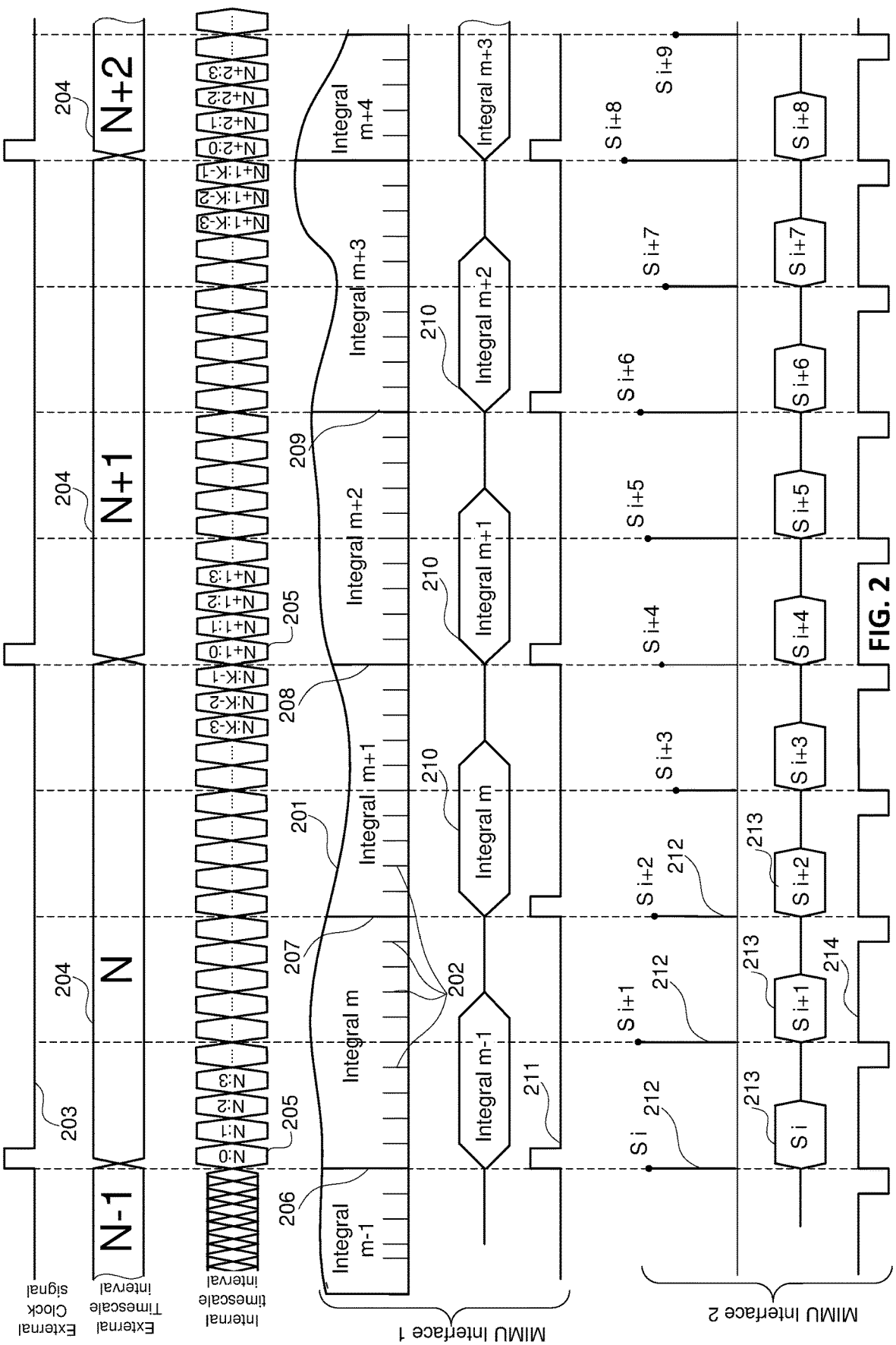

FIG. 2 presents embodiments of formats for output MIMU measurements via different interfaces.

Figure 3:
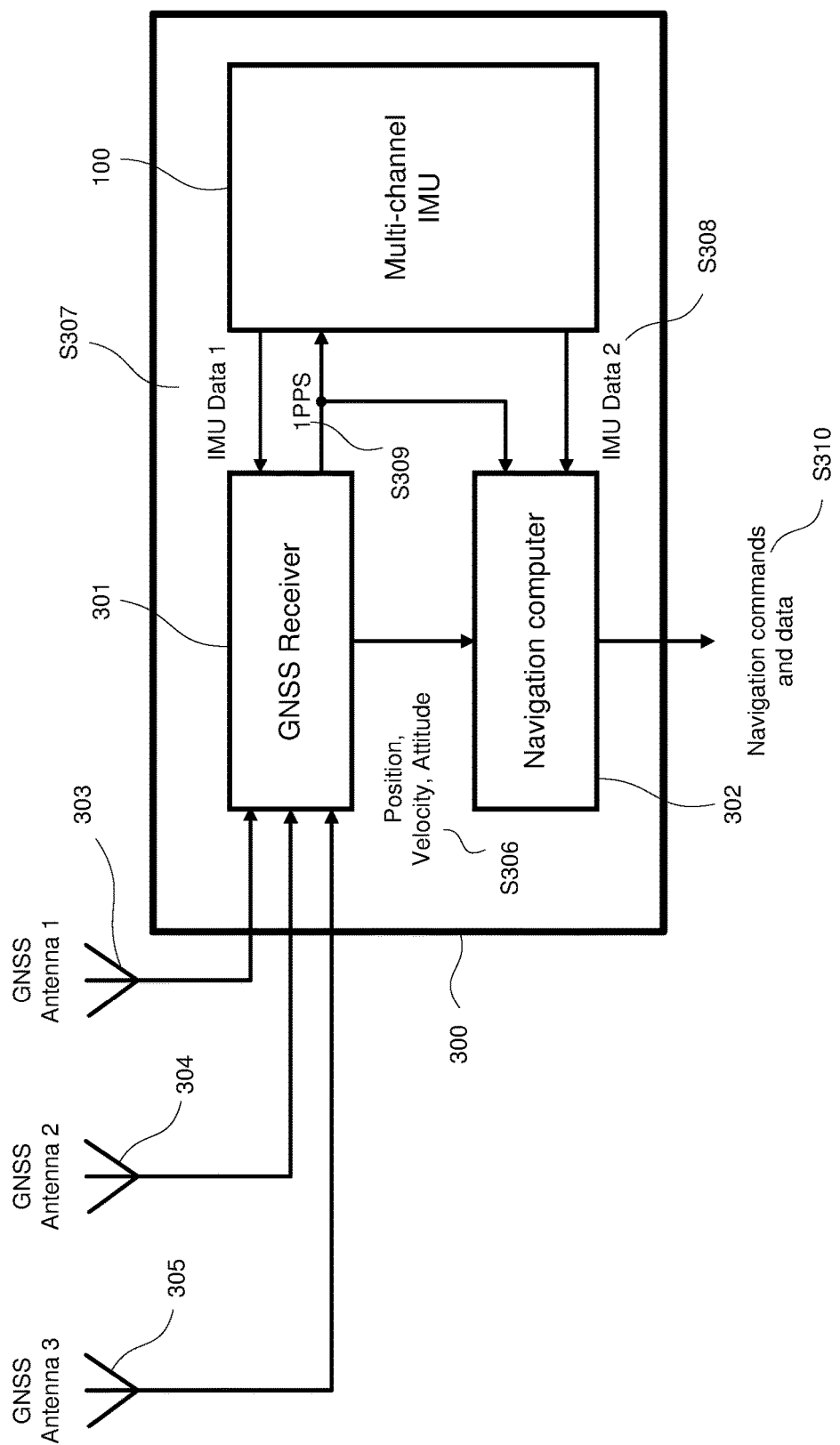

FIG. 3 presents an embodiment of MIMU comprising a GNSS receiver and a navigation computation unit.

Figure 4:
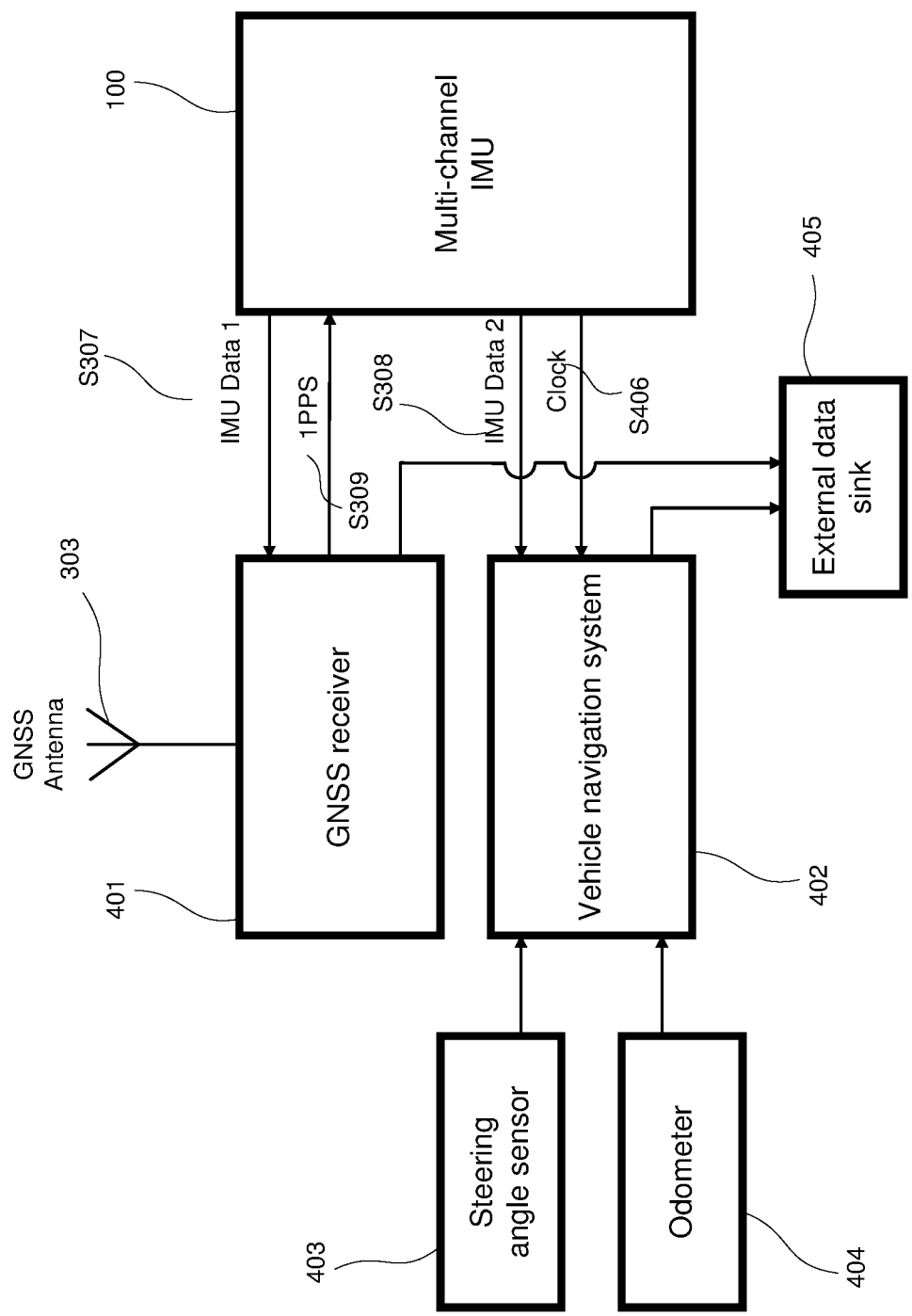

FIG. 4 presents an embodiment of MIMU with some navigation devices of different types.

DETAILED DESCRIPTION OF EMBODIMENTS OF THE INVENTION

Reference will now be made in detail to the preferred embodiments of the present invention, examples of which are illustrated in the accompanying drawings.

A generalized diagram of a strapdown MIMU is shown in FIG. 1. The strapdown MIMU 100 includes vector sensors such as a 3D-gyroscope 101, a 3D-accelerometer 102, a 3D-magnetometer 103, and a computation unit 104. The computation unit 104 is connected to several connectors 105 located on the MIMU housing and allows external users to be connected to the measurement information.

Signals from the vector sensors 101-103 are read out by a sensors readout unit 106, which is intended for generating a set of instantaneous measurements of the vector sensors in digital form for the same time instant. This unit can include multichannel devices for analog to digital conversion (if output sensor signals are analog ones), pulse counters or any standard digital in-circuit interfaces (like UART, SPI, I2C, etc.), if the sensors 101-103 are digital.

The set of instantaneous measurements is sent from the readout unit 106 to a data pre-processing unit 107. In the data pre-processing unit 107, the obtained data is scaled, thermally corrected, and freed from sensitivity axes misalignment. Some other errors typical for inertial measurements are removed as well. The data pre-processing unit 107 can also average or numerically integrate raw data obtained from the readout unit 106. This unit can provide data in one or some pre-set formats of measurements (scaled vector measurements, integrals of measurements over the pre-set time intervals, integrals of measurements etc.) to output such data to the user.

Data preparation for transmission via physical MIMU interfaces which are presented by the connectors 105 is done in interface controllers 108. These controllers define the type of the physical interface working through corresponding the connector 105, pack data in information packets to transmit via physical interface and so on. Interface controllers 108 are used for setting formats (type, pulse edge, polarity) for input and output synchronization signals. If a synchronization signal from an external source has one of the pre-defined formats, upon reception it is converted to the internal MIMU format and transmitted to a synchronization unit 109. If the synchronization signal is transmitted from MIMU to the external user, the interface unit 108 receives the signal in an internal format from the synchronization unit 109 and converts it into one of the pre-defined formats assigned by the user.

The synchronization unit 109 generates an internal timescale according to which all the operations of obtaining and processing the measurement information are implemented inside the MIMU and outputs measurement results to the external users. The synchronization unit 109 can receive the reference signal to generate timescale both from one of external sources via the controllers 108 and from an internal clock generator 110. Internal synchronization signals generated by the unit 109 are used for clocking readout operations from the sensors 101-103 in the unit 106, pre-processing operation in the unit 107 and operations of output packets generating and transmitting in the interface units 108. The unit 109 also contains adjusted priority logic to select a single source of external synchronization, if two or more sources are available.

The clock generator 110 is used for clocking all computational operations and operations of inter-unit data exchange inside the computation unit 104. The clock generator 110 can be also used as a source of reference signals to generate an internal timescale of the MIMU 100 when external synchronization sources are unavailable or turned off.

FIG. 2 shows an overview of a simultaneous transmission of measurements via different interfaces of the MIMU. Primary measurements of an analog quantity 201 are done by the readout unit 106 at a relatively high rate (of hundreds or thousands Hz) at discrete instants 202 counted by the clock generator 110. External clock signal 203 can be fed to the input of one of the MIMU interfaces (exemplarily shown that counting instants of the external timescale coincide with rising edges of signal impulses 203). Each active signal edge 203 indicates to the beginning of an interval 204 of the external timescale with a current number N. If such a signal is present, then the MIMU internal timescale is synchronized such that exactly K equidistant discrete time instants 202 should fit between a pair of neighboring synchronization pulses 203. An interval 205 of the internal timescale being synchronized with the external scale is designated as N:k, where: N is the number of the interval of the external timescale, k=0 . . . K−1 is the number of discrete time instant of the internal scale inside the interval of the external scale with number N. Synchronization of internal and external scales is made such that the instant 202 of the internal scale with number N:0 corresponds to the active edge of signal 203 referring to the interval with number N. If the signal of the external synchronization 203 is absent, the instant 202 is generated by the clock generator 110 in accordance with the internal settings.

Each scalar sensing element of vector sensors 101-103 measures a parameter 201 varying in time. Depending on the sensor type, it can be a component of the angular speed vector, a component of specific acceleration vector, or a component of magnetic intensity vector. Raw data read out by unit 106 at time instants 202 is transmitted to the pre-processor 107 where this data are subject to different operations specific for preliminary processing of inertial measurements.

One of the exemplary pre-processing methods can calculate definite (short-term) integrals of neighboring sections of signal 201 of the same duration as Integral m calculated over time interval from instant 206 up to instant 207, Integral m+1 calculated from instant 207 up to instant 208, Integral m+2 calculated from instant 208 up to instant 209 and so on. For example, short-term integration results, calculated from accelerometers measurements, may be interpreted as vehicle's velocity increments. Also, short-term integration results, calculated from gyros measurements, may be interpreted as vehicle's attitude angular rotation increments. Calculated short-term integration results are transmitted to one of interface controllers 108 that generates packets 210 to transmit data (values of short-term integration results) to external users. The instant of ending the calculation of integration, which matches the moment of transmitting a packet with its numerical value and the moment of starting the calculation of the next integral, is indicated with synchronization impulses 211 generated according to the MIMU internal timescale to the external user. The type and format of packets 210, as well as format of the synchronization impulses 211, are selected in the interface controller 108 from the pre-defined set.

Another exemplary method of pre-processing raw data can be scaling and resampling (or decimation) of raw data obtained by readout unit 106. Resampled and scaled measurements 212 are instantaneous measured values of signal 201 taken with a period increased in multiples of a period of time instants 202. (Resampling refers to providing data at a different rate, e.g., when the original data was sampled at 100 Hz, resampled data might be at 74 Hz for example. Decimation refers to dropping some samples to achieve a lower rate, e.g., if the original data was sampled at 100 Hz, after decimation, 3 out of every 4 samples are dropped, resulting in a 20 Hz effective sampling rate.) The multiplicity of periods (resampling factor) and bandwidths of anti-aliasing filters are set in the settings of the corresponding interface controller 108 wherein the data packets 213 are generated from values after decimation. The instant of taking sample 212 of the signal 201 is indicated to the external user using synchronization impulses 214 of the corresponding interface. The type and format of the packets 213, as well as format of the synchronization impulses 214 are selected in the interface controller 108 from a pre-defined set.

One exemplary embodiment of the use for the MIMU is shown in FIG. 3. Such a system 300 includes a GNSS receiver 301, the navigation computation unit 302, and an MIMU 100 simultaneously connected to both of them. If the receiver 301 operates with one antenna 303, it determines only its position and velocity of its phase center. If an additional GNSS antenna 304 is connected to the receiver, then in addition to position and velocity of antenna 303 the receiver can determine incomplete orientation (two Euler's angles of the three) of the base to which these two antennas are rigidly fixed. Another GNSS antenna 305 allows the receiver to define the complete orientation of the base (three Euler's angles). So the maximum set of navigation data S306 that the receiver 301 is able to transmit to the navigation computation unit 302 includes position, velocity and 3D-orientation of the rigid base to which the GNSS antennas 303, 304, 305 are attached.

The MIMU 100 is connected to the receiver 301 and the navigation computation unit 302 via two different interfaces with different transmission and data presentation formats (in general case). For example, let the MIMU's measurements set S307 transmit vector measurements of the 3D-gyroscope 101, and the 3D-accelerometer 102 integrated over neighboring intervals with duration of 0.01 sec (orientation angle increments and velocity vector increments respectively) to the receiver 301 through the one MIMU interface. Let the MIMU's measurements set S308 comprising corrected measurements of the 3D-gyroscope 101, and the 3D-accelerometer 102 (components of angular vector and specific acceleration vector respectively) and the raw data of the 3D-magnetometer 103 be transmitted to the navigation computation unit 302 through another MIMU interface. Signal 1PPS S309 generated by the GNSS receiver 301 is exemplarily considered as a signal of the MIMU external synchronization. The same signal is connected to the navigation computation unit 302 to synchronize its operation with the GNSS timescale.

Measurements S307 are coupling in the receiver 301 with its radio navigation measurements to enhance the quality and availability of GNSS solutions. Measurements S308 transmitted to navigation and control computation unit are used in the algorithms of navigation and control for a moving vehicle onto which the integrated system 300 is installed. The set of output parameters S310 of the integrated system 300 is generated in the navigation computation unit 302 and can include not only the information S306 but also some stabilization and control commands for the vehicle with the system installed.

Another exemplary embodiment of using MIMU with navigation devices of different types is shown in FIG. 4. The MIMU 100 is then simultaneously connected, for example, to one separate GNSS receiver 401 and to a vehicle navigation system 402. The GNSS receiver 401 receives signals from navigation satellites via the antenna 303. A steering angle sensor 403 and an odometer 404 are the raw data sensors for the vehicle navigation system 402. Both the separate vehicle navigation systems 401 and 402 are connected to an external data sink 405 via the corresponding hardware interface. Vehicle data collector, board computer, or another similar device can be an example of an external data sink.

The MIMU data S307 transmitted to the receiver 401 through one interface are used by receiver's firmware to improve the quality and availability of GNSS solutions. The MIMU data S308 transmitted to the vehicle navigation system 402 are exemplarily used to detect possible slipping of the vehicle or to detect readout errors from the sensors 403 and 404. The MIMU data S307 and/or S308 can be transmitted to an external user 405 along with measurements of the vehicle navigation systems 401 and/or 402, respectively.

Measurements within the MIMU S307 are synchronized with an external timescale by signal 1PPS S309 generated inside the receiver 401. This timescale is transmitted to the vehicle navigation system 402 with the aid of a clock signal S406 generated within the MIMU S307 and synchronized with the signal S309.

As will be appreciated by one of ordinary skill in the art, the various blocks shown in FIGS. 1, 3 and 4 can be implemented as discrete hardware components, as an ASIC (or multiple ASICs), as an FPGA, as either discrete analog or digital components, and/or as software running on a processor.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

REFERENCES

1. U.S. Pat. No. 6,879,875 B1, Low Cost Multisensor High Precision Positioning and Data Integrated Method and System thereof, Hu et al.
2. U.S. Pat. No. 9,423,426 B1, Sampling and Control Circuit Board for an Inertial Measurement Unit, David T. Chelmins, Richard T. Powis, Jr., Obed Sands.
3. U.S. Pat. No. 4,303,978, Integrated-Strapdown-Air-Data Sensor System, Jack C. Shaw, John F. Gilbert, Guy R. Olbrechts, Melville D. McIntyre.
4. US Patent Publication No. 2014/0168009 A1, Multi-IMU INS for Vehicle Control, John W. Peake.
5. US Patent Publication No. 2008/0270017 A1, Asynchronous Inertial Navigation System, Steven L. Saks
6. EP 2645061 A2, Reduction of link requirements of an inertial measurement unit (IMU/AP) for a strapdown inertial system (SDI), Luinge, Hendrik Johannes; Dijkstra, Freerk; Bellusci, Giovanni.

What is claimed is:

1. A multichannel strapdown inertial measuring unit (MIMU) comprising:
    a readout unit configured to receive raw measurement data from a plurality of inertial sensors;
    a pre-processing unit configured to correct errors in the raw measurement data;
    a plurality of customizable controllers of external interfaces for bidirectional information exchange with external receivers and sources of data;
    at least one electromechanical connector configured to connect to external modules for data transfer;
    at least one electromechanical connector configured to receive external synchronization signals generated by external sources;
    at least one electromechanical connector configured to provide internally generated synchronization signals to external receivers,
    wherein the synchronization signals from different external sources use different timescales; and
    a synchronization device providing joint operation of the readout unit, the pre-processing unit, and interface controllers using a common timescale,
    wherein the MIMU outputs an inertial data through one of the controllers and one of the electromechanical connectors.

2. The strapdown MIMU of claim 1, wherein information exchange is implemented through each external interface independent of exchange status of other external interfaces.

3. The strapdown MIMU of claim 2, wherein interface type and data exchange format through each external interface is selected from a pre-defined set of formats independent of the format selection in other external interfaces.

4. The strapdown MIMU of claim 1, wherein one external source of synchronization signal out of several external sources of synchronization signals is selected based on pre-defined settings that are determined at initialization.

5. The strapdown MIMU of claim 4, which uses an internal clock source when an external clock signal is unavailable.

6. The strapdown MIMU of claim 5, wherein all receiving of the raw measuring data, exchange of data between (i) the readout unit, (ii) the preprocessing unit and (iii) the data interface controllers, conversion of data to another format or another scale in the preprocessing unit, and the output of the inertial data are synchronized with the selected synchronization signal.

7. The strapdown MIMU of claim 6, wherein the MIMU transmits clock signals synchronized with the selected synchronization signal to external users, and wherein the format of the data is selected from a pre-defined format list independently for each output interface.

8. The strapdown MIMU of claim 1, wherein each electromechanical connector for the external interface includes in-built contacts to connect a data exchange interface, to receive an external clock signal and to transmit an internal clock signal.

9. The strapdown MIMU of claim 1, wherein the data pre-processing unit scales and/or thermally corrects and/or frees from sensitivity axes misalignment the raw measurement data.

10. The strapdown MIMU of claim 1, wherein the sensors include a gyroscope and an accelerometer.

11. The strapdown MIMU of claim 1, wherein the sensors include a magnetometer.

12. An integrated inertial-satellite navigation system comprising:
    a GNSS (Global Navigation Satellite System) receiver;
    a microprocessor coupled to the GNSS receiver and receiving positioning data from the GNSS receiver;
    a multichannel inertial measuring unit (MIMU) including
    (i) a readout unit configured to receive raw measurement data from a plurality of inertial sensors;
    (ii) a pre-processing unit configured to correct errors in the raw measurement data;
    (iii) a plurality of customizable controllers of external interfaces for bidirectional information exchange with external receivers and sources of data;
    (iv) at least one electromechanical connector configured to connect to external modules for data transfer;
    (v) the MIMU including at least one electromechanical connector configured to receive synchronization signals generated by the microprocessor or by the GNSS receiver;
    (vi) the MIMU including at least one electromechanical connector configured to output synchronization signals generated by the MIMU,
        wherein the synchronization signals from the microprocessor and the GNSS receiver use different timescales than the synchronization signals generated by the MIMU; and
    (vii) a synchronization device providing joint operation of the readout unit, the pre-processing unit, and interface controllers using a common timescale,
    wherein the MIMU outputs an inertial data through one of the controllers and one of the electromechanical connectors to the microprocessor;
    wherein the microprocessor outputs a current position and velocity based on the positioning data and the inertial data.

13. The integrated inertial-satellite navigation system of claim 12, wherein:
    one external interface of the MIMU is connected to the GNSS receiver;
    another MIMU external interface is connected to the microprocessor.

14. The integrated inertial-satellite navigation system of claim 13, wherein a clock signal generated by the GNSS receiver and synchronized with a GNSS receiver timescale is used for timescale synchronization of MIMU.

15. The integrated inertial-satellite navigation system of claim 14, wherein the GNSS receiver and the microprocessor are mounted on a common printed cirquit board (PCB).

16. The integrated inertial-satellite navigation system of claim 13, further comprising a second GNSS receiver coupled to the microprocessor, wherein each GNSS receiver is connected to its own external interface of the MIMU.

17. A navigation system comprising:
- a plurality of navigation devices that generate coordinate and/or velocity and/or attitude and/or other navigation data;
- a multichannel inertial measuring unit (MIMU) coupled to the plurality of navigation devices, wherein each navigation device is connected to a separate hardware interface of MIMU, and
- wherein the MIMU includes
  - (i) a readout unit configured to receive raw measurement data from the plurality of navigation devices;
  - (ii) a pre-processing unit configured to correct errors in the raw measurement data;
  - (iii) a plurality of customizable controllers of external interfaces for bidirectional information exchange with external receivers and sources of data;
  - (iv) at least one electromechanical connector configured to connect to external modules for data transfer;
  - (v) at least one electromechanical connector configured to receive synchronization signals generated by the navigation devices;
  - (vi) at least one electromechanical connector configured to provide synchronization signals generated internally by the MIMU to the navigation devices, wherein the synchronization signals from the navigation devices use different timescales than the synchronization signals generated internally by the MIMU; and
  - (vii) a synchronization device providing joint operation of the readout unit, the pre-processing unit, and interface controllers using a common timescale,
- wherein the MIMU outputs an inertial data to one of the navigation devices.

18. The navigation system of claim 17, wherein one of plurality of navigation devices is a GNSS receiver.

* * * * *